(12) United States Patent
Lee

(10) Patent No.: US 8,670,226 B2
(45) Date of Patent: Mar. 11, 2014

(54) LIQUID CRYSTAL DISPLAY MODULE FIXTURE FOR PORTABLE COMMUNICATION DEVICE

(75) Inventor: Seung-Jae Lee, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 222 days.

(21) Appl. No.: 12/578,632

(22) Filed: Oct. 14, 2009

(65) Prior Publication Data

US 2010/0259873 A1 Oct. 14, 2010

(30) Foreign Application Priority Data

Oct. 14, 2008 (KR) .................. 10-2008-0100633

(51) Int. Cl.
G06F 1/16 (2006.01)
(52) U.S. Cl.
CPC .................................. *G06F 1/1601* (2013.01)
USPC .................. 361/679.21; 349/58; 313/582
(58) Field of Classification Search
USPC .................. 361/679.21–679.23; 349/58–60; 313/582
See application file for complete search history.

(56) References Cited

U.S. PATENT DOCUMENTS

| | | | |
|---|---|---|---|
| 6,392,723 B1 * | 5/2002 | Sugiyama et al. ............. 349/58 |
| 6,507,377 B1 * | 1/2003 | Jung ................................. 349/60 |
| 6,626,550 B2 * | 9/2003 | Choi ............................. 362/632 |
| 6,688,576 B2 * | 2/2004 | Oishi et al. ..................... 248/317 |
| 6,894,739 B2 * | 5/2005 | Sung et al. ........................ 349/58 |
| 6,900,598 B2 * | 5/2005 | Hibino et al. ............... 315/169.4 |
| 7,139,047 B2 * | 11/2006 | Park .................................. 349/58 |
| 7,170,759 B2 * | 1/2007 | Soga ............................... 361/825 |
| 7,175,242 B2 * | 2/2007 | Lee et al. ........................ 312/7.2 |
| 7,209,195 B2 * | 4/2007 | Lin .................................. 349/58 |
| 7,213,981 B2 * | 5/2007 | Lin .................................. 385/92 |
| 7,218,521 B2 * | 5/2007 | Kim ............................... 361/704 |
| 7,236,357 B2 * | 6/2007 | Chen ......................... 361/679.55 |
| 7,237,941 B2 * | 7/2007 | Hsieh et al. ................... 362/633 |
| 7,463,490 B2 * | 12/2008 | Kim et al. ..................... 361/752 |
| 7,524,198 B2 * | 4/2009 | Nguyen et al. ................ 439/131 |
| 7,672,137 B2 * | 3/2010 | Kim et al. ..................... 361/752 |
| 7,819,627 B2 * | 10/2010 | Walters ........................ 416/90 R |
| 2001/0002145 A1 * | 5/2001 | Lee et al. ......................... 349/58 |
| 2002/0060758 A1 * | 5/2002 | Jeong et al. ..................... 349/65 |
| 2003/0223020 A1 * | 12/2003 | Lee .................................. 349/58 |
| 2005/0243106 A1 * | 11/2005 | Bae et al. ....................... 345/679 |
| 2006/0029355 A1 * | 2/2006 | Lin ................................. 385/137 |
| 2006/0055839 A1 * | 3/2006 | Hirao et al. ..................... 349/58 |
| 2006/0146486 A1 * | 7/2006 | Wikstrom et al. ............. 361/681 |
| 2006/0238446 A1 * | 10/2006 | Takahashi et al. .............. 345/55 |
| 2007/0052100 A1 * | 3/2007 | Bellinger ........................ 257/758 |
| 2007/0139872 A1 * | 6/2007 | Lee et al. ....................... 361/681 |
| 2007/0195494 A1 * | 8/2007 | Miyoshi et al. ............... 361/681 |
| 2007/0258199 A1 * | 11/2007 | Jeong ........................... 361/681 |
| 2008/0247127 A1 * | 10/2008 | Finnegan ...................... 361/681 |

* cited by examiner

*Primary Examiner* — Adrian S Wilson
(74) *Attorney, Agent, or Firm* — Cha & Reiter, LLC

(57) ABSTRACT

An LCD module fixing device for a portable communication device, including: at least one fixing part cut from a bottom surface of the LCD module using a cutter, and folded back so that the cut bottom surface protrudes from an outer edge of the LCD module. The fixing part is formed from and arranged on the LCD module so as to extend therefrom. A latching portion of the fixing part is attached to a housing of a portable communication device, preferable to a latching rib of the portable communication device.

2 Claims, 9 Drawing Sheets

LIQUID CRYSTAL DISPLAY MODULE FIXTURE FOR PORTABLE COMMUNICATION DEVICE

CLAIM OF PRIORITY

This application claims priority under 35 U.S.C. §119(a) from a Korean Patent Application entitled "Liquid Crystal Display Module Fixture For Portable Communication Device" filed in the Korean Intellectual Property Office on Oct. 14, 2008 and assigned Serial No. 10-2008-0100633, the contents of which are incorporated herein by reference in its entirety.

BACKGROUND OF THE INVENTION

1. Field of the Invention

The present invention relates to a Liquid Crystal Display (LCD) module fixing device for a portable communication device. More particularly, the present invention relates to arrangement of an LCD device in a portable communication module that is an improvement over the conventional assembly groove.

2. Description of the Related Art

In general, "a portable communication device" refers to a device which performs functions that typically include wireless communication between the user and another person. Portable communication devices include HHP, CT-2, cellular phones, digital phones, PCSs, PDAs, etc. Wireless terminals are often classified into bar-type terminals, flip-type terminals, folder-type terminals, sliding-type terminals, and pop up-type terminals according to their appearance. Portable communication devices essentially include an antenna device, a data input/output device, and a data transmitting/receiving device. Further, the data input/output device typically uses an LCD for a display.

Further, the number of users using a portable communication device has dramatically increased so that most people now own a portable communication device. Initially, portable communication devices provided only a voice service for basic telephone calls. However, recent devices have emerged that are capable of providing functions such as listening the radio, reproducing MP3, watching a moving image, a remote control, or the like.

Further, such recent portable communication devices have satisfied consumer demands for more compactness and slimness. Therefore, the industry emphasis has been to seek ways to improve upon slimming the thickness of such portable communication devices while maintaining or improving its functions, as customer demand in this area for such improvements has not slowed. In order to achieve the slimness of the portable communication device, a display unit of the communication device should also be slim.

As shown in FIG. 1, the conventional display unit includes a housing 2, a window 3 for display, and an LCD module 4.

As also shown in FIGS. 1 and 2, the housing 2 additionally includes a conventional fixing device 5 for fixing the components of the display unit in order to prevent the known problem wherein the LCD module 4 pushes out the window 3 and protrudes therefrom due to, for example the user accidentally dropping the communication device 1 and/or a high-temperature and high-humidity environment that make the LCD more likely to protrude from the window 3.

Still referring to FIGS. 1 and 2, in the conventional fixing device 5, an assembly groove 4*a* formed on an outer edge of the LCD module 4 is assembled with a latching member made of a metal material, and the latching member is latched to a latching rib 2*a* formed on the housing 2 so as to fix the LCD module 4.

The conventional fixing device 5 of the LCD module should be manufactured with an additional molding in order to be mounted on the LCD module 4 and should also be made of the metal material in order to prevent it from breakage.

However, the fixing device should include the assembly groove 4*a* that is formed on the LCD module in order to be mounted on the LCD module, which causes the problem of interference of making the LCD module slim.

Furthermore, if the assembly groove 4*a* is not formed on the LCD module for making the LCD module slim, the fixing device cannot be mounted thereon.

Further, the conventional fixing device that is manufactured with a molding for making the LCD module compact and slim has increased manufacturing costs.

In order to solve the problems described above, as shown in FIGS. 3 to 5, if a protrusion 6 is made of the material such as synthetic resins, and is injection formed on an outer circumference of the LCD module 4, the LCD module 4 will be easily broken and separated when the product is dropped, as will occur from time to time during normal use.

SUMMARY OF THE INVENTION

Accordingly, the present invention provides an LCD module fixing device for a portable communication device which includes at least one fixing part that is cut from the LCD module and folded over so as to double back and protrude from the LCD module, so that it does not require additionally forming the fixing part for fixing the LCD module, and thereby saves on product manufacturing costs and increases the ease of manufacture.

The present invention provides an LCD module fixing device for a portable communication device in which a fixing part cuts and folds the LCD module, and makes the LCD module protrude so as to reduce the required thickness of the fixing part and make the product slimmer when the fixing part is manufacture in a such a manner that a part of the LCD module is cut, folded, and protruded, which is contrary to the conventional fixing part used in the art that is manufactured by molding and injection. The present invention overcomes disadvantages of increased thickness of a product that was required for the conventional construction.

The present invention also provides an LCD module fixing device for a portable communication device which includes at least one assembly part and an assembly flange fitted to the LCD module so as to fix the LCD module and prevent the LCD module from breakage and separation when the product falls down.

In accordance with an exemplary aspect of the present invention, there is provided an LCD module fixing device for a portable communication device, including: at least one fixing part that is partially cut from a bottom surface of the LCD module using a cutter and foldedback along the bottom surface so that the cut bottom surface protrudes from an outer surface of the LCD module, the fixing part preferably being formed on the LCD module.

Additionally, one end of the fixing part may include a folding part for making the cut bottom surface of the LCD module protrude from the edge of the LCD module, and another end of the fixing part includes a latching part latching onto a latching rib formed on a housing of the portable communication device to be fixed.

Additionally, the fixing part preferably controls a protruding length of the LCD module according to a cut length by the cutter.

Moreover, the fixing part cuts the bottom surface and a side-wall surface of the LCD module using the cutter and makes the cut surfaces protrude from the outer circumference of the LCD module.

The fixing part may also cut a side-wall surface of the LCD module using the cutter so as to make the cut surface protrude from the outer surface of the LCD module.

In accordance with another exemplary aspect of the present invention, there is provided an LCD module fixing device for a portable communication device, including: at least one assembly part formed on a circumference of the LCD module; and at least one assembly flange mounted on a housing of the portable communication device and fitted to the assembly parts.

Furthermore, the at least one assembly part preferably includes a fitting hole.

Further, the assembly flanges include: a fitting protrusion assembled with the assembly parts and fixing the LCD module; and a supporting member attached to an inside housing so as to support the fitting protrusion.

BRIEF DESCRIPTION OF THE DRAWINGS

The above and other exemplary aspects, features and advantages of the present invention will become more apparent from the following detailed description taken in conjunction with the accompanying drawings, in which.

DETAILED DESCRIPTION

Figure 1:
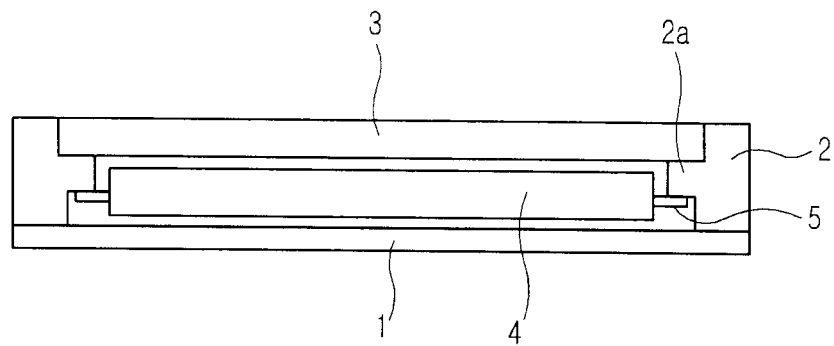
FIG. 1 is a side-sectional view illustrating the construction of a conventional LCD module fixing device for a portable communication device.
Figure 2:
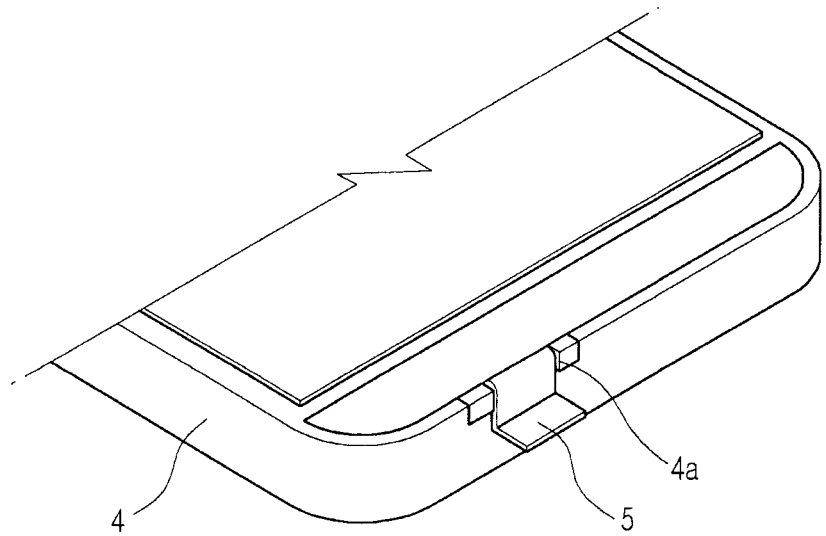
FIG. 2 is a perspective view illustrating the operating state of a conventional LCD module fixing device for a portable communication device.
Figure 3:
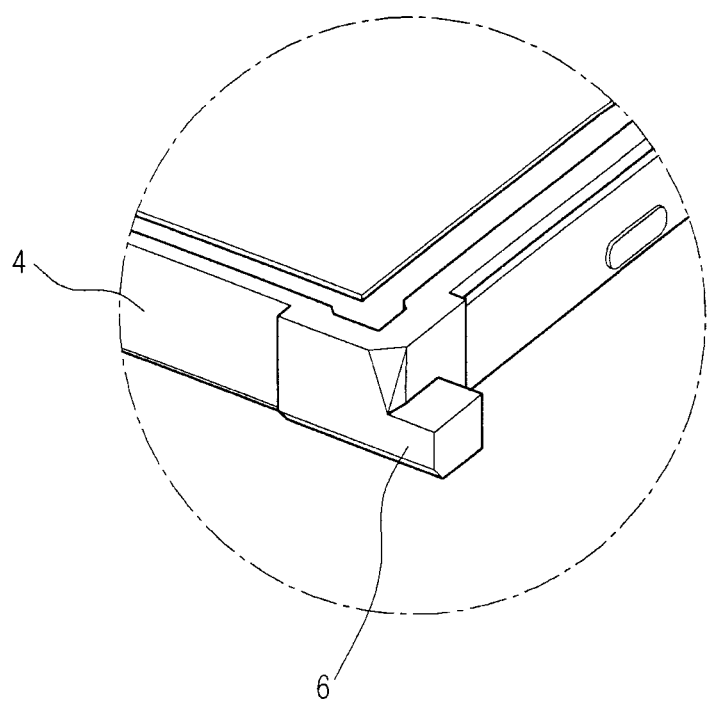
FIG. 3 is a perspective view illustrating the construction of another embodiment of a conventional LCD module fixing device for a portable communication device.
Figure 4:
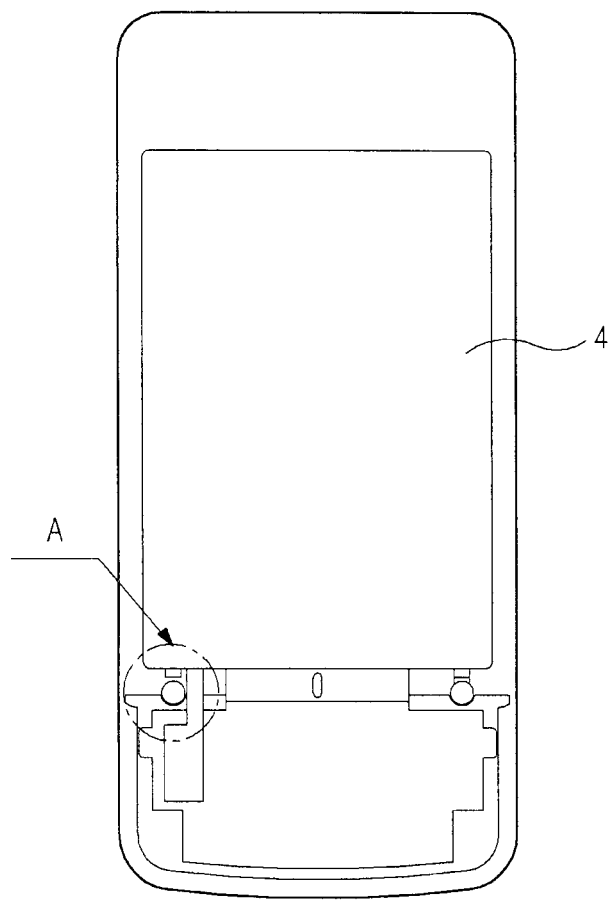
FIG. 4 is a perspective view illustrating the operating state of another embodiment of a conventional LCD module fixing device for a portable communication device.
Figure 5:
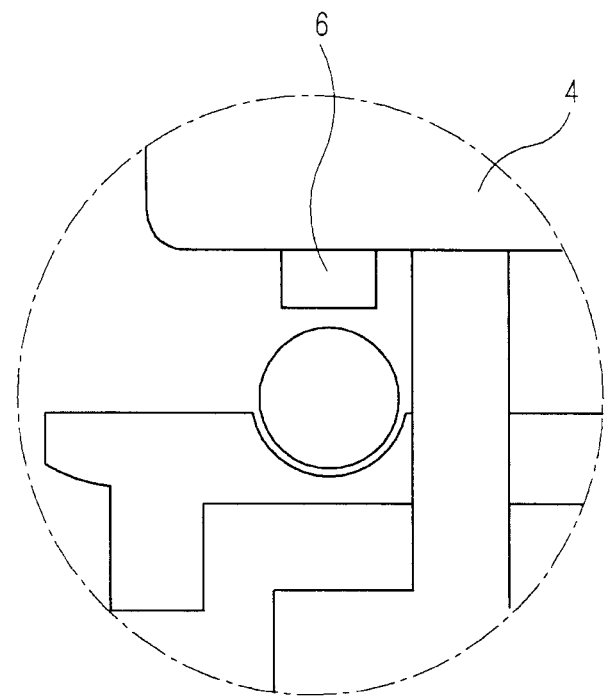
FIG. 5 is an enlarged perspective view of A portion of FIG. 4.

Hereinafter, exemplary embodiment(s) of the present invention will be described with reference to the accompanying drawings. The structure shown and described herein and the various constructions illustrated in the drawings are only the exemplary embodiments provided for illustrative purposes, and do not represent all of or limit the technical spirit and scope of the present invention and the appended claims. Therefore, a person of ordinary skill in the art will understand that there can be various alternative modifications at the time of filing the subject invention.

Figure 6:
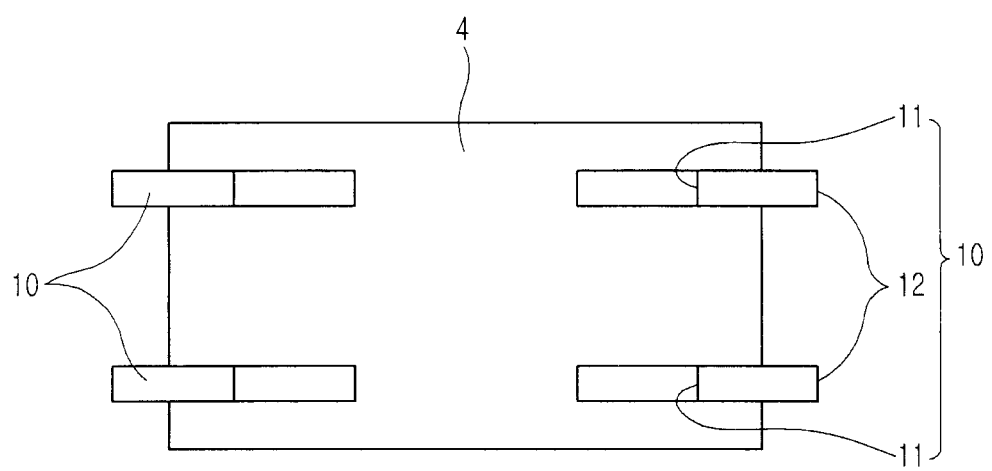
FIG. 6 is a bottom view illustrating an LCD module fixing device of a portable communication device according to a first exemplary embodiment of the present invention.
Figure 7:
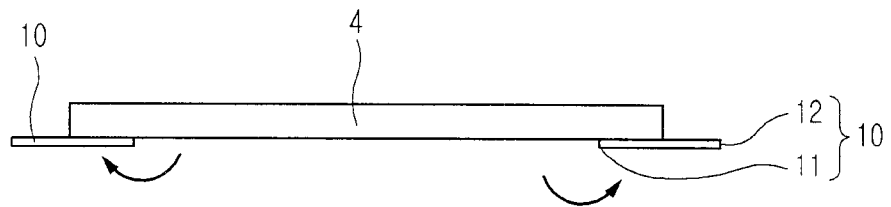
FIG. 7 is a side view illustrating the construction of an LCD module fixing device of a portable communication device according to a first exemplary embodiment of the present invention.
Figure 8:
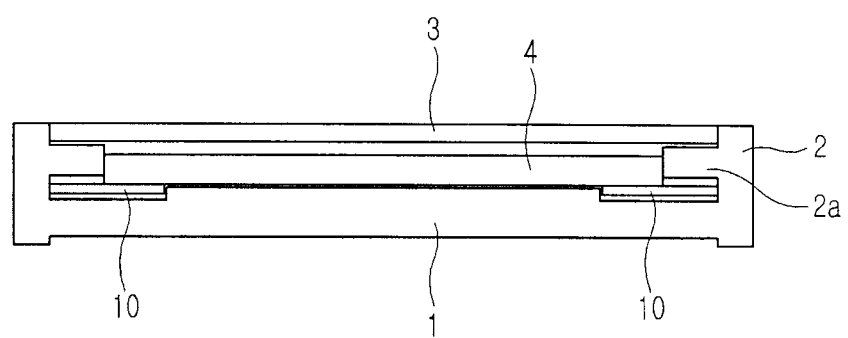
FIG. 8 is a side-sectional view illustrating the usage state of an LCD module fixing device of a portable communication device according to a first exemplary embodiment of the present invention.

Now referring to FIGS. 6 to 8, an LCD module fixing device of a portable communication device can include at least one fixing part 10 that is cut from a bottom surface of the LCD module 4 using a cutter (not shown) and folding the cut surface of the LCD module 4 to make the cut surface of the LCD module 4 protrude from the outer circumstance of the LCD module 4.

One end 12 of the fixing part 10 includes a folding part enabling the cut surface of the LCD module 4 to protrude from the outer circumference of the LCD module 4.

The other end 11 of the fixing part 10 includes a latching part that latches to a latching rib 2a formed on the portable communication device 1 to be fixed.

The fixing part 10 can control the protruding length of the LCD module 4 according to the cutting length by the cutter (not shown).

Figure 9:
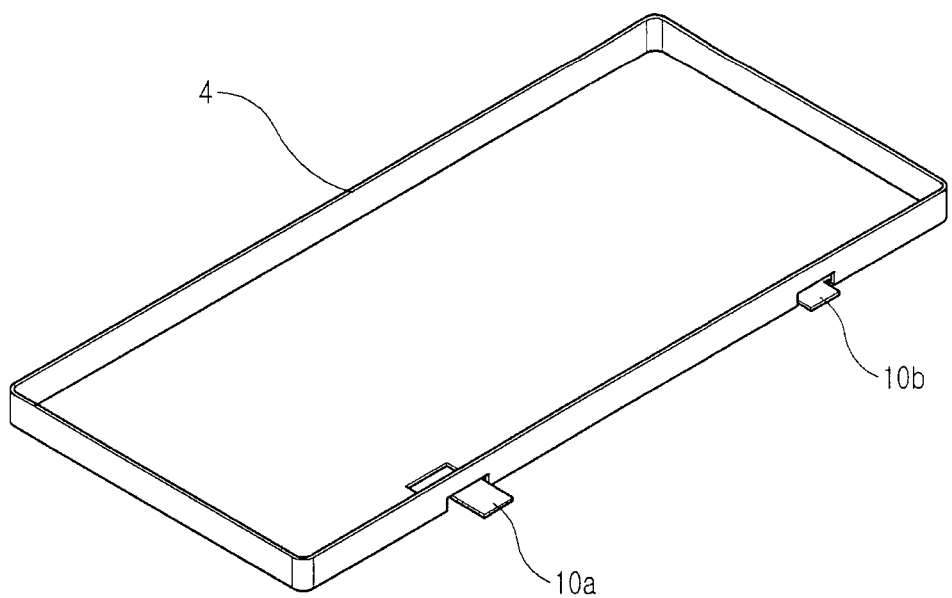
FIG. 9 is a perspective view illustrating another embodiment of an LCD module fixing device of a portable communication device according to a first exemplary embodiment of the present invention.
Figure 10:
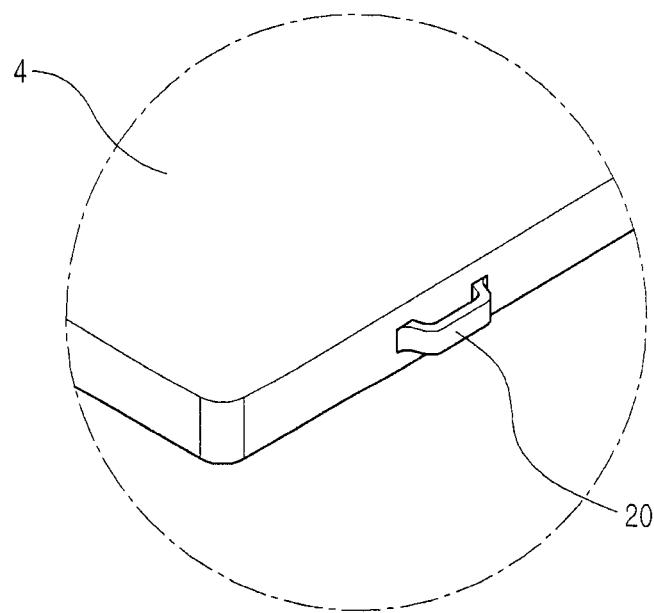
FIG. 10 is a perspective view illustrating an assembly part in the construction of an LCD module fixing device of a portable communication device according to the second exemplary embodiment of the present invention.
Figure 11:
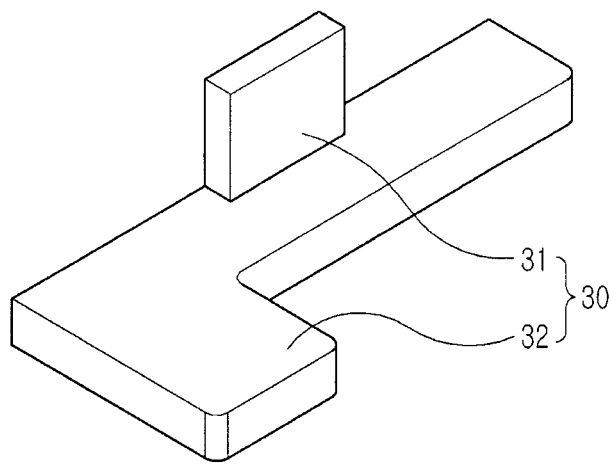
FIG. 11 is a perspective view illustrating an assembly flange in the construction of an LCD module fixing device of a portable communication device according to the second exemplary embodiment of the present invention.
Figure 12:
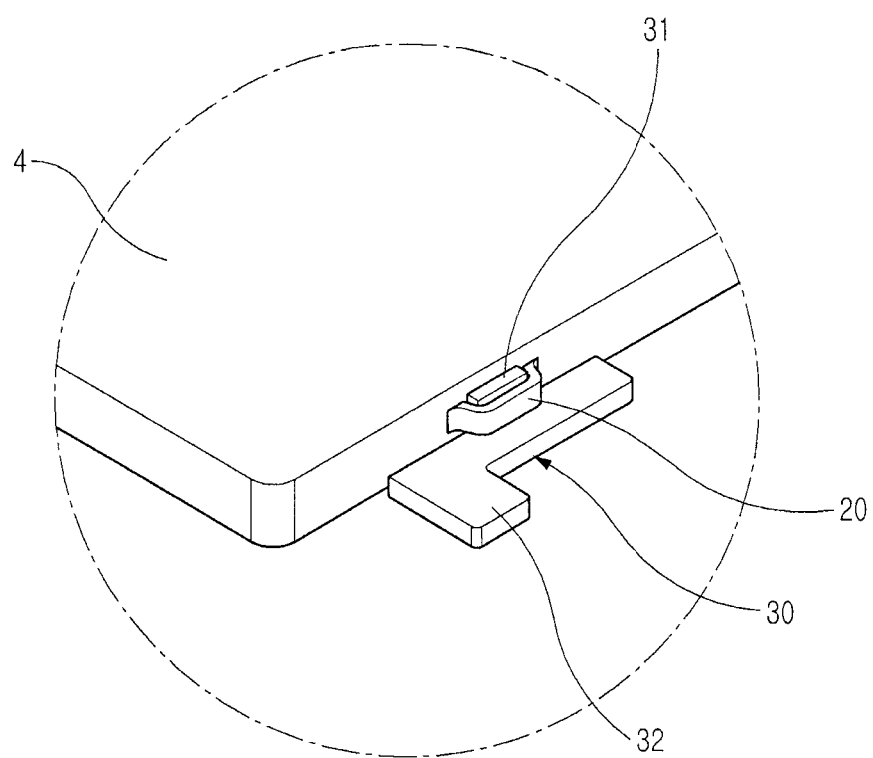
FIG. 12 is a perspective view illustrating an assembly state of an assembly part and an assembly flange in the construction of an LCD module fixing device of a portable communication device according to the second exemplary embodiment of the present invention.
Figure 13:
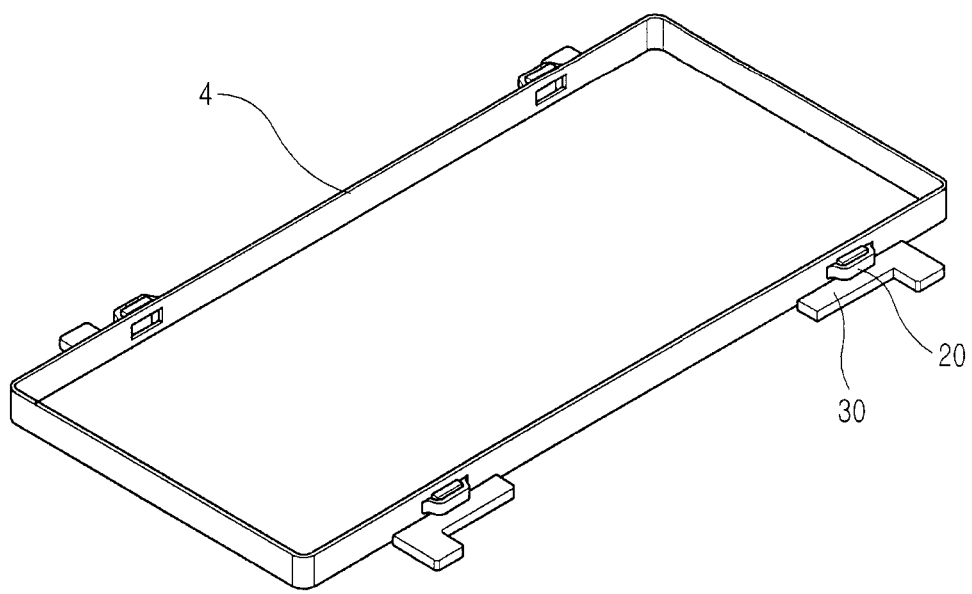
FIG. 13 is a side-sectional view illustrating the usage state of an LCD module fixing device of a portable communication device according to a second exemplary embodiment of the present invention.

As shown in FIG. 9, which illustrates another exemplary embodiment of the fixing part, the fixing part 10a is cut into the bottom surface of the LCD module 4 and a side-wall surface of the LCD module 4 using the cutter and folds the cut surfaces of the LCD module 4 to make the cut surfaces of the LCD module 4 protrude from an outer circumstance of the LCD module 4.

Further, as shown in FIG. 9 illustrating another exemplary embodiment of the fixing part, the fixing part 10b passes through the side-wall surface of the LCD module 4 via an opening cut by the cutter and folds the cut surface of the LCD module to make the cut surface of the LCD module 4 protrude from an outer circumstance of the LCD module 4.

The operating process of the LCD module fixing device for the portable communication device according to the first exemplary embodiment of the present invention having the foregoing construction will be described with reference to FIGS. 6 to 9 in more detail.

As shown in FIGS. 6 to 8, the LCD module fixing device for the portable communication device includes at least one fixing part 10.

The fixing part 10 is cut into/from the bottom surface of the LCD module 4 in a predetermined size using the cutter (not shown), and in this state, the cut surface forming the fixing part is folded so that the cut surface of the LCD module 4 is doubled-back and protrudes from the edge of the LCD module 4.

One end 11 of the fixing part 10 includes a folding part enabling the fixing part 10 to be rotated and folded after the fixing part 10 cuts the surface of the LCD module 4, and the other end 12 of the fixing part protrudes from the outer surface of the LCD module 4 by the folding part.

In this state, the LCD module 4 is assembled with the housing 2 of the portable communication device 1 and the fixing parts 10 of the LCD module 4 latch onto the latching rib 4a formed on the portable communication device 1 to be fixed.

In this state, the LCD module 4 includes a window 3 on the upper portion of the LCD module 4.

As shown in FIG. 9 illustrating another exemplary embodiment of the fixing part, the fixing part 10a is cut into/from the bottom surface of the LCD module, and a passage is cut into the side-wall surface of the LCD module 4 using the cutter, and wherein the cut surfaces of the LCD module 4 are folded so as to make the cut surfaces of the LCD module 4 protrude from an outer surface of the LCD module 4 as a fixing part 10.

Further, as shown in FIG. 9 illustrating another exemplary embodiment of the fixing part, the fixing part 10b is cut into/from the side-wall surface of the LCD module 4 using the cutter and the fixing part 10b is folded so that the cut surface of the LCD module 4 protrudes from an outer circumstance of the LCD module 4.

As such, the LCD module fixing device includes at least one fixing part that is cut from and folded across the bottom surface of the LCD module 4 so as to fix the LCD module 4. Therefore, it is possible to reduce the costs for the manufacture of the product and decrease the thickness of the fixing part 10, thereby making the product slimmer than known heretofore.

The operating process of the LCD module fixing device for the portable communication device according to the second exemplary embodiment of the present invention having the foregoing construction will be described in more detail with reference to FIGS. 10 to 13.

As shown in FIGS. 10 to 13, the LCD module fixing device for the portable communication device includes at least one assembly part 20 and at least one assembly flange 30.

The assembly flanges 30 are mounted on the housing 2 of the portable communication device 1. In this state, the assembly parts formed on the outer edge of the LCD module 4 are fitted to the assembly flanges 30 to be assembled.

The assembly parts 20 include a fitting hole, and the assembly flanges 30 include a fitting protrusion 31 that extends at least partially through the fitting hole and a supporting member 32, and the fitting protrusion 31 is assembled with the assembly parts 20 and fixes the LCD module 4. The supporting member 32 is attached to the inside of the housing 2 for supporting the fitting protrusion 31.

As such, the present invention includes the configuration in which the LCD module 4 is fitted by the assembly parts 20 and the assembly flanges 30 so that it is possible to prevent the LCD module from being broken and separated when the product falls down.

The present invention also includes the configuration in which the LCD module 4 is fitted to the housing 2 of the portable communication device 1 so that the LCD module 4 can be easily assembled with and separated from the housing 2 of another portable communication device 1.

While the LCD module fixing device for the portable communication device of the present invention has been shown and described with reference to certain exemplary embodiments and drawings thereof, it will be understood by those skilled in the art that various changes in form and details may be made therein without departing from the spirit and scope of the invention as defined by the appended claims. For example, it is possible to attach a fixing part to the bottom LCD module rather than cut it from the LCD module, although the latter is preferred.

What is claimed is:

1. A Liquid Crystal Display (LCD) module fixing device for affixing an LCD module to a portable communication device, comprising:
   at least one fixing part integrally formed from the LCD module by being partially cut away from a bottom planar surface of the LCD module extending beyond a perimeter of the LCD module and co-planar to a central portion of the LCD module and folded back along a hinge portion in an opposite direction from being cut to protrude from an edge of the LCD module and, wherein a latching portion of the fixing part is attached to a housing of the portable communication device, wherein the fixing part is cut from the bottom surface and a side-wall surface of the LCD module so that the fixing part protrudes from the edge of the LCD module.

2. The LCD module fixing device as claimed in claim 1, wherein the fixing part controls a protruding length of the LCD module according to an amount of length cut from the LCD module.

* * * * *